May 2, 1950 D. COLLINS 2,506,543
AUXILIARY CONTROL FOR HYDRAULIC BRAKES
Filed March 15, 1948 2 Sheets-Sheet 1

INVENTOR.
Douglas Collins
BY
Glascock, Downing & Seebold
Attorneys.

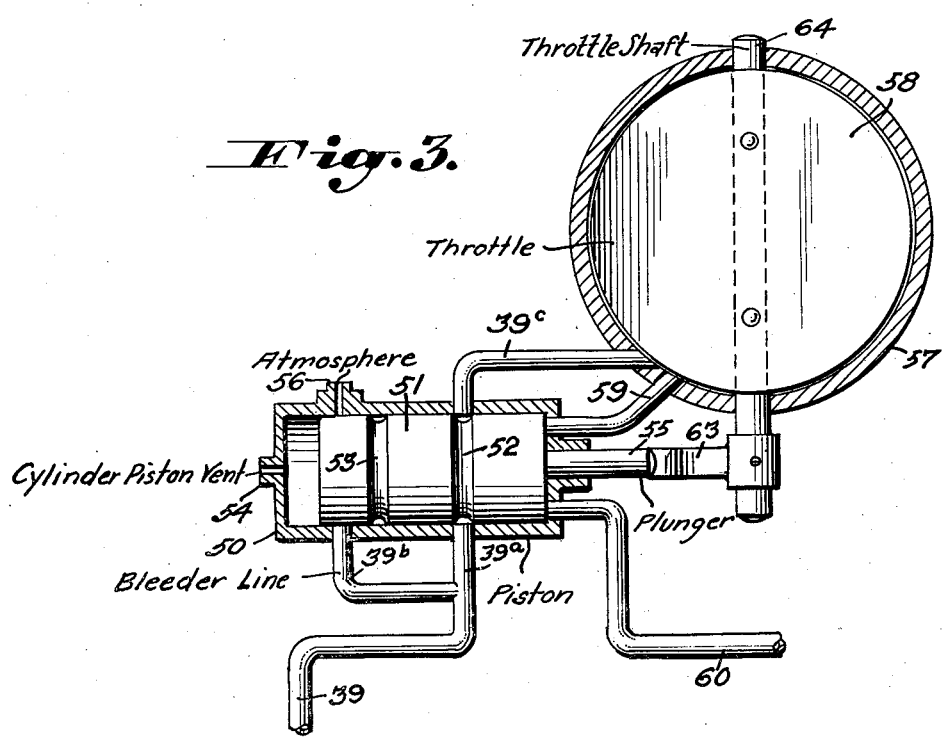
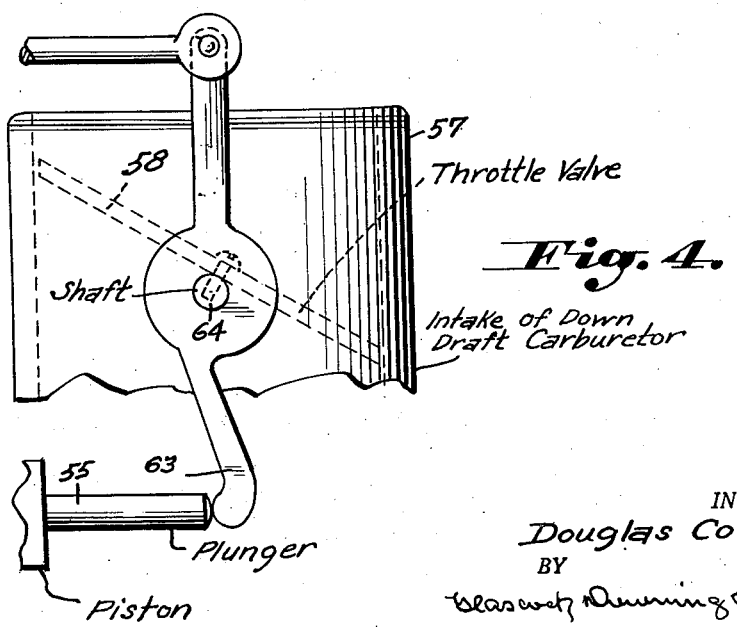

Patented May 2, 1950

2,506,543

UNITED STATES PATENT OFFICE 2,506,543

AUXILIARY CONTROL FOR HYDRAULIC BRAKES

Douglas Collins, Salisbury, N. C.

Application March 15, 1948, Serial No. 14,868

8 Claims. (Cl. 192—3)

This invention relates to devices for affording auxiliary control for hydraulic brakes and is concerned more particularly with improvements in the control disclosed in my prior Patent No. 2,183,444, dated December 12, 1939.

According to my prior invention it is necessary that the vehicle operator retain the control vent closed by the application of the hand thereto for as long a period as it may be desired to maintain the brakes applied with the desired effect and this, in cases involving prolonged periods of applications is inconvenient, tiring and deprives the operator of freedom of use of the hands.

The object of the present invention is to overcome these disadvantages and to provide an arrangement wherein only the momentary application of the hand to the control vent effects such adjustment as to maintain the brakes applied with the desired force for as long a period as desired without necessitating the long continued use of the hand for that purpose.

A further object is the provision of means operative under the control of the engine throttle valve for rendering the auxiliary control ineffective and restoring the brake system to normal condition in which the brakes are operable in a useful manner under the control of the brake pedal.

In the accompanying drawing wherein an improved embodiment of the invention is illustrated:

Figure 3 is an enlarged detailed sectional view of the device controlling operation of the servomotor.

Figure 4 is a fragmentary side view of a portion of the engine showing the throttle valve and its relation to the servo-motor control device.

Figure 1:
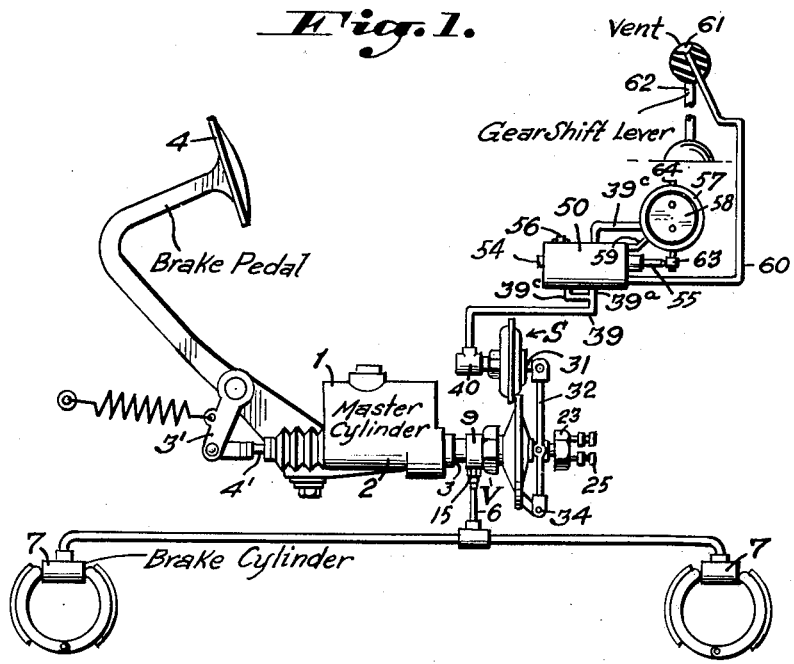
Figure 1 is an assembly view showing the auxiliary control mechanism combined with a conventional hydraulic braking system and throttle valve of a motor vehicle.

Referring to the drawing in detail, and particularly to those parts which are disclosed in my prior patent above referred to, the oil reservoir 1 has the usual parts communicating with and supplying oil to the master cylinder 2 of the brake applying mechanism, and the oil under pressure is discharged through port 3 into the brake-system when the spring-returned brake-pedal 4 is depressed in usual manner. Through crank arm 3' and stem 4' the slide piston 5 is moved to the right in the cylinder to create brake-pressure in the pipe 6 and in the brake cylinders, two of which are shown at 7, 7, for the application of the brakes.

The auxiliary control mechanism which includes a vacuum operated servo-motor indicated as a whole by the letter S, and a valve-device indicated as a whole by the letter V, is interposed between the discharge port 3 of the master-cylinder and the brake-cylinders, two of which are indicated as 7, 7.

Figure 2:
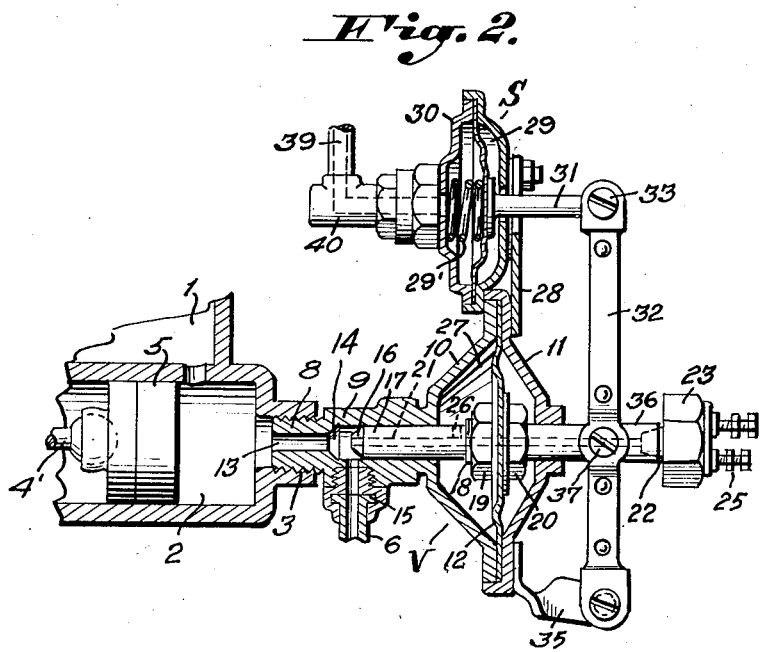
Figure 2 is an enlarged vertical sectional view of a portion of the master cylinder, valve device and the servo-motor, the parts being shown in the position occupied when the auxiliary control device is ineffective.

The valve device, as best seen in Figure 2, is connected to the master cylinder at its discharge end by means of a threaded nipple 8 that is screwed into the boss forming the discharge port 3 of the master cylinder. The nipple is rigidly mounted upon an extension 9 of one section 10 of the valve-casing, the other section 11 of the casing providing an interior chamber for a flexible and resilient diaphragm 12 that is clamped between the two sections of the casing.

In Figure 2 it will be seen that when the brake pedal is depressed, the piston 5 is moved to force oil under pressure from the master cylinder 2, through the port 13, thence through a tapered valve-seat 14, and thence the oil is forced down through an outlet port at the under side of the extension and through a pipe-connection 15 to the oil pipe 6 and the brake cylinders 7, for an application of the brakes.

After the brakes have been applied, passage of oil under pressure from the master cylinder through the valve seat 14 to the brakepipe 6, may be cut off, for the purpose of retaining the applied brake-pressure in the brake cylinders, thus holding the brakes applied. This cut-off between the master-cylinder and the brake-cylinders is accomplished by the use of a needle valve, or tapered control valve 16 fashioned on one end of a tubular stem 17, which is externally threaded at 18, and mounted to slide in central openings of the casing 10—11. The stem also passes through a central opening in the diaphragm 12, and by means of a pair of lock nuts 19 and 20 screwed on the threads 18 at opposite sides of the diaphragm, the stem is mounted in the diaphragm for a slide-piston movement in its bearings in the valve casing and in the extension 9 of the casing.

The tubular stem is fashioned with a longitudinally extending bore or passage 21, aligned with the longitudinal axis of the master cylinder 2, and the outer end of this passage is closed by suitable means, as a threaded tubular head 22 of a casing 23. The threaded tubular head is screwed into a socket at the outer end of the stem, as the latter projects through the valve-casing, and the switch-casing contains a fluid-pressure operated circuit-maker or switch for the usual stop-light that is carried at the rear of the automotive vehicle; connections from the light being made to the terminals 25 of the switch.

The tubular valve-stem is fashioned with a transversely extending port 26, which affords passage of oil from the bore 21 to the interior of an oil chamber 27 in the casing 10, at the brake-side of the casing. Thus it will be apparent that oil through the reduced bore 21 and port 26 having a sub-normal pressure, or a pressure below that of the braking pressure is constantly accessible for operating the stop-light switch, and also for extending the subnormal pressure against the brake-side of the diaphragm 12, as a safety measure, to assure unseating of the valve in the event that it is closed for any reason, when the brakes are to be applied.

In the event the auxiliary control mechanism is to be used as a "hill-holder" after the brakes are applied, the normally open valve is moved to its seat to close communication from the brake pipes and thereby retain the pressure already applied in the brake-pipes 6 and in the brake cylinders 7. This closing of the valve against tension of the resilient diaphragm 12, is accomplished through the action of differential fluid pressure operating in the servo-motor S, and through lever connections with the valve-stem 17. The servo-motor is preferably mounted above and rigid with the valve casing 10—11, through the use of a supporting bracket 28 fastened to both the valve casing and the servo-motor, and the motor includes a flexible diaphragm 29 mounted within the casing 30. The spring 29' urges the diaphragm to the right in Figure 2 in the absence of a vacuum at the left side of the diaphragm, and it acts to open the valve 16 and release the brakes. The diaphragm, by means of an arm 31 is connected to a lever 32 by the pivot 33, and the lower end of the lever is hinged or pivoted at 34 to a bracket 35 rigid with the lower part of the valve casing.

The lever is pivotally connected at 37 to the free end 36 at the stem 17.

The parts of the auxiliary control so far described are substantially the same as those identified by corresponding reference numerals in my prior Patent No. 2,183,444. The present improvement involves a departure from the previous device for controlling the operation of the servo-motor S and consists of a suction pipe 39 having one end connected by a coupling 40 with the casing 30 at one side of the diaphragm 29. The opposite end of the pipe 39 is branched at 39a—39b and connected with a cylinder 50 at two axially spaced points. The piston 51 is slidably mounted in the cylinder 50 and is provided with two grooves 52 and 53 spaced apart a distance less than the distance between the branches 39a and 39b. At one end the cylinder is provided with a pressure equalizing vent 54 communicating with the atmosphere and a rod 55 carried by the piston projects from the opposite end of the cylinder.

The cylinder is further provided with an atmospheric port 56 in the same circumferential plane as the branch 39b so that when the piston is moved to the left (Figure 3) communication between the pipe branch 39b and the port 56 is established by the groove 53. A suction pipe 39c is connected at one end with the cylinder 50 at a point in the same circumferential plane as the pipe branch 39a so that the groove 52 connects the pipes 39a and 39c when the piston is in the position shown in Figure 3.

The opposite end of the pipe 39c is connected with the intake manifold 57 or other part of the fuel induction passage of the engine of the motor vehicle at a point between the inlet valves (not shown) and the throttle valve 58. The end of the cylinder 50 opposite the vent 54 is connected with the manifold 57 by a pipe 59 and is further connected with a pipe 60 formed of flexible or other material leading to a normally open control vent 61 in the gear shift lever 62 or other part of the motor vehicle within convenient reach of the operator. As will be understood, when the vent 61 is closed as by the application of the operator's finger thereto the full effect of the suction existing in the intake manifold is exerted upon the piston 51 and the latter is moved to the right as a consequence of the pressure differential existing between the end of the cylinder that is open to atmosphere and the end thereof that is in communication with the intake manifold through the pipe 59.

With the piston in the latter position the rod 55 is disposed in position to be engaged by an arm 63 on the shaft 64 of the throttle valve 58 as the latter moves from the closed position shown in Figure 4 towards the open position upon depression of the usual accelerator, not shown. Thus during the initial open movement of the throttle valves the piston 51 is automatically moved from the right to the left hand position by fluid pressure, under manual control.

The cylinder 50 is preferably disposed in a horizontal position so that the piston 51 is not influenced by gravity or any other force tending to move it out of the position to which it has been moved within the cylinder as a result of the above described fluid pressure actuation by the opening movement of the throttle valve 58.

Under normal conditions the piston 51 is in its left hand position thereby establishing communication between the left side of the casing 30 and the atmosphere through the atmospheric vent 56, groove 53, branch 39b, pipe 39, and coupling 40. In this condition of the auxiliary control the valve 17 is maintained in open position by the spring 29' acting against the diaphragm 29 and the lever 32, consequently the brakes of the vehicle may be hydraulically operated in the usual manner under control of the brake pedal 4. Also under these conditions the vent 61 is open and unobstructed by the hand of the operator and the piston 51 remains in the left hand position in the cylinder 50 due to its own inertia. When the applied brake pressure is to be retained in the brake cylinders the finger of the vehicle operator is momentarily applied to the vent 61 to cap the same and hence the pressure differential existing between the opposite ends of the cylinder 50 is applied to the piston 51 through the vent 64 and the piston is caused to assume the right hand position shown in Figure 3 in which the atmospheric port 56 is closed and communication between the pipe 39c and the branch 39a and thus the pipe 39 is established by the groove 52. The pressure at the left side of the diaphragm 29 is relieved through the communicating pipe 39 and the ensuing displacement of said diaphragm oscillates the lever 32 and closes the valve 17. In this manner communication through the brake pipe 6 is interrupted and the brakes remain applied with the desired force. Naturally, the brakes are applied only when the engine throttle 58 is closed, and consequently the arm 63 of the throttle valve is in such position as to accommodate movement of the piston or control valve 51 toward the right. The piston is moved to the latter position by the momentary application of the finger of the operator to the vent 61 and thereafter the finger may be removed, the piston 51 remaining in the right hand position by its own inertia. To restore the piston 51 to the inoperative left hand position it is merely necessary for the operator to slightly open the throttle valve 58 and is so doing the arm 63 engages the rod 55 and shifts the piston to inoperative position.

Therefore, and as readily apparent from the drawings, I have provided a no-roll control for a motor vehicle that is under manual control to be automatically actuated by fluid pressure means to hold the brakes applied and which control is automatically moved to ineffective position by manually operable means, the fluid pressure means relying on the pressure differential existing between the intake manifold and the atmosphere.

What I claim is:

1. In combination an engine manifold, a hydraulic brake system including a pressure pipe leading to the brake cylinders, a normally open valve in said pipe operable when closed to interrupt passage through said pipe, a differential fluid pressure operated servo-motor for operating said valve, control means movable into different positions for alternately connecting said servo-motor with atmosphere and the engine manifold, said control means being pressure sensitive and automatically movable into one position under the influence of the engine manifold vacuum and manually controlled means affecting the pressure sensitivity of said control means so that said control means move into said position, and manually controlled means for moving said control means into said other position.

2. In combination an engine manifold, a hydraulic brake system including a pressure pipe leading to the brake cylinders, a normally open valve in said pipe operable when closed to interrupt passage through said pipe to hold the brakes applied, a differential fluid pressure operated servo-motor for operating said valve, control means movable into different positions for alternately connecting said servo-motor with atmosphere and the engine manifold, said control means being pressure sensitive and automatically movable into one position under the influence of engine manifold vacuum to connect said servo motor with the manifold to close the valve, and manually controlled means for rendering said control means sensitive and movable into said valve closing position.

3. In combination an engine manifold, a hydraulic brake system including a pressure pipe leading to the brake cylinders, a normally open valve in said pipe operable when closed to interrupt passage through said pipe and hold the brakes applied, a differential fluid pressure operated servo-motor for operating said valve, control means movable into different positions for alternately connecting said servo-motor with atmosphere and the engine manifold, said control means being connected to the manifold and pressure sensitive under the influence of the vacuum existing therein to move into one position to render said servo motor capable of closing said valve and a capable atmospheric vent communicating with said manifold by way of said control means and adapted when momentarily capped to render said control means sensitive to pressure and the influence of the manifold vacuum.

4. In combination, an engine intake manifold and throttle valve, a hydraulic brake system including a pressure pipe leading to the brake cylinders, a normally open valve in said pipe operable when closed to interrupt passage through said pipe to hold the brakes applied, a differential fluid pressure operated servo-motor for operating said valve, control means pressure sensitive to the influence of vacuum existing in the manifold and movable into different positions for alternately connecting said servo-motor with atmosphere and the engine manifold, manually controlled means affecting the pressure sensitivity of the control means so that the same automatically moves into one position, and means controlled by the throttle valve for positively moving the control means into another position.

5. An arrangement as claimed in claim 4 wherein said control means is constituted by a cylinder and a piston movable therein.

6. An arrangement as claimed in claim 4 wherein said control means includes a cylinder and a piston movable therein an atmospheric vent for the cylinder on one side of the piston, said manually controlled means including a connection between the manifold and said cylinder on the opposite side of the piston and another connection between said cylinder and the atmosphere on the latter side of the piston, said last mentioned connection being adapted to be momentarily capped to permit the pressure differential existing on opposite sides of the piston to move the control means into the first mentioned position.

7. An arrangement as claimed in claim 4 wherein said control means includes a cylinder and a piston movable therein, said throttle valve controlled means including a member connected to the throttle valve and disposed exteriorly of the manifold and movable in a path in alignment with the piston and adapted to engage and move said piston into the second mentioned position when the throttle valve is opened.

8. In combination, an engine intake manifold, a throttle valve therein, a shaft for said throttle valve adapted to be rotatably moved under influence of an accelerator pedal, a hydraulic brake system including a pressure pipe leading to brake cylinders, a normally open valve in said pipe operable when closed to interrupt passage through said pipe and hold the brakes applied, and manually controlled fluid pressure operated means including a cylinder and a piston valve movable therein and rendered effective by momentary variation of fluid pressure in the cylinder to automatically move in one direction and maintain said first mentioned valve in closed position, said fluid pressure operated means providing alternate communication between said manifold and the atmosphere and operable when vented to atmosphere to open said first mentioned valve to release the brakes, and means connected to the throttle valve shaft and operable when moved thereby when the accelerator pedal is depressed to contact said piston valve and move the same in an opposite direction to vent said fluid pressure operated means to atmosphere.

DOUGLAS COLLINS.

REFERENCES CITED

The following references are of record in the file of this patent:

UNITED STATES PATENTS

| Number | Name | Date |
|---|---|---|
| 2,080,295 | Wheeler | May 11, 1937 |
| 2,183,444 | Collins | Dec. 12, 1939 |
| 2,201,125 | Freeman | May 11, 1940 |
| 2,224,747 | Sacks | Dec. 10, 1940 |
| 2,313,430 | Goepfrich | Mar. 9, 1943 |